(12) United States Patent
Parameswar et al.

(10) Patent No.: US 8,512,426 B2
(45) Date of Patent: Aug. 20, 2013

(54) STEAM-HYDROCARBON REFORMER IMPROVED MANIFOLD SUPPORT AND HEADER BOX SYSTEM

(75) Inventors: Srikantiah N. Parameswar, Katy, TX (US); Vaibhav Kaushik, Missouri City, TX (US)

(73) Assignee: Technip France, Courbevoie (FR)

( * ) Notice: Subject to any disclaimer, the term of this patent is extended or adjusted under 35 U.S.C. 154(b) by 278 days.

(21) Appl. No.: 13/198,537

(22) Filed: Aug. 4, 2011

(65) Prior Publication Data

US 2013/0034471 A1 Feb. 7, 2013

(51) Int. Cl.
*B01J 8/00* (2006.01)

(52) U.S. Cl.
USPC ........................................................ 48/127.9

(58) Field of Classification Search
None
See application file for complete search history.

(56) References Cited

U.S. PATENT DOCUMENTS

| | | | |
|---|---|---|---|
| 3,460,924 | A | 8/1969 | O'Sullivan |
| 3,721,531 | A | 3/1973 | Tuncer |
| 3,768,980 | A | 10/1973 | Andersen |
| 4,175,779 | A | 11/1979 | Apblett, Jr. |

FOREIGN PATENT DOCUMENTS

| | | |
|---|---|---|
| EP | 0 423 905 | 4/1991 |
| FR | 2 315 478 | 1/1977 |
| GB | 1192688 | 5/1970 |

OTHER PUBLICATIONS

Harf-Bapin, E., International Search Report for International Application No. PCT/US2012/048966, European Patent Office, dated Nov. 6, 2012.
Harf-Bapin, E., Written Opinion for International Application No. PCT/US2012/048966, European Patent Office, dated Nov. 6, 2012.
"Steam-Hydrocarbon Reformer Furnace Design", Foster Wheeler, unknown date of publication but existed prior to the application filing date of Aug. 4, 2011.

*Primary Examiner* — Imran Akram
(74) *Attorney, Agent, or Firm* — Locke Lord LLP

(57) ABSTRACT

The disclosure provides an independent support of outlet system in a steam reformer furnace. The thermal expansion of the firebox and/or header box that occurs during operation of a reformer is decoupled from the manifold. The manifold is supported independently on a separate saddle support that supports and allows the manifold to move, while the manifold is still substantially enclosed in the header box. The header box is allowed to expand thermally into different configurations without forcing a substantial change in the manifold configuration. Further, the present invention allows the transfer lines coupled to the manifold through connection tees to laterally move the manifold and reduce lateral stress on the manifold. Thus, the invention provides for independent support of the manifold that allows vertical, lateral, and longitudinal thermal expansion of associated components without overstressing the manifold and causing failures.

10 Claims, 5 Drawing Sheets

STEAM-HYDROCARBON REFORMER IMPROVED MANIFOLD SUPPORT AND HEADER BOX SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The invention relates to independent support of an outlet manifold in a steam reformer furnace, and more specifically related to independent support of an outlet manifold within a heated enclosure of a steam reformer furnace.

2. Description of the Related Art

A steam reforming process is a well-established catalytic process that converts natural gas or light hydrocarbons into a mixture containing a major portion of hydrogen. The steam reforming process has gained more and more importance with the increasing demand of various types of gases for the chemical and petrochemical industries, including hydrogen, ammonia, and others. In particular, hydrogen has become a very important product for the refinery desulphurisation and hydrocracking process units.

FIG. 1 is a perspective schematic view of a known exemplary reformer. FIG. 2 is an end schematic view of the reformer shown in FIG. 1. FIG. 3 is a detail end view of a manifold guide system used in the exemplary reformer shown in FIG. 1. The figures will be described in conjunction with each other. A steam-hydrocarbon reformer 2 generally includes three principal sections on the process side of the furnace internals, namely an inlet system 4, a plurality of catalyst tubes 6, and the outlet system 10 with the catalyst tubes being contained in a furnace firebox 8. The inlet system 4 is generally located on an upper portion of the reformer 2 and contains a heated steam-hydrocarbon mixture that enters through an inlet 5. The inlet system 4 directs flows of the mixture to the catalyst tubes 6. The catalyst tubes 6 are internally filled with a catalyst that assist in breaking the molecular bonds of the mixture to allow formation of the desired gases. A variety of catalysts (nickel-based) are available for a given feed and product requirement. The reformer reaction process is endothermic, requiring high level heat input. Because the process requires high heat input levels, the catalyst-filled tubes are placed vertically in the radiant firebox section of the furnace. The steam-hydrocarbon mixture is typically preheated outside the radiant section to minimize the radiant heat load and, therefore, the furnace fuels requirement. The catalyst tubes 6 are arranged typically in multiple rows of "once-through" parallel "passes", with the preheated inlet mixture entering the top of each catalyst tube, and exiting at the bottom. Two rows 7A, 7B with five catalyst tubes each are shown only for illustrative purposes with the understanding that the actual numbers of manifolds and tubes likely will be different than shown. For example, one known reformer uses four rows and 54 tubes per row. Once the reformed gas exits the catalyst tubes 6, it is collected in the outlet system 10. The outlet system 10 typically includes a manifold 12A, 12 B (generally "12" and likewise for other numbers) for each row of catalyst tubes 6. The outlet manifolds 12 are pipes running horizontally below each row 7 of catalyst tubes 6. In the illustrated embodiment, a manifold 12A would receive flow from the tube row 7A, and a manifold 12B would receive flow from the tube row 7B. The manifolds 12 in turn are connected to a central transfer line 14A through connection tees 16 for aggregating multiple manifolds. Further, more than one set of manifolds and transfer lines can be used, such as another transfer line 14B from another set of manifolds (not shown), which may be from another section in the same reformer or another reformer. The reformed gas from the transfer line 14A (and 14B) can flow into an external process gas waste heater 18 for cooling of the gas. The heater 18 can therefore heat other flow streams using the heated reformed gas output through an infeed line 20 that exits through an outfeed line 22, such as to generate steam or similar duties. The effluent in the effluent line 19 from the heater 18 is typically cooled to permit further reaction in further downstream equipment. Safe and reliable operation of the reformer furnace depends on the disposition of the catalyst tubes, manifolds, transfer lines, the external process gas waste heater, and connections therebetween.

One of the critical components on the reformer is the supports for the outlet system 10. The manifolds 12 are enclosed within an insulated header box 26 and are supported within the header box. A plurality of manifold upper guides 36 and a plurality of manifold lower guides 38 are attached on each side of the header box with a vertical gap therebetween and a manifold support slide lug 40 is attached to the manifold 12 that is slidably disposed between the manifold upper and lower guides with some lateral and vertical clearance. Thus, the manifold support slide lug 40 on the manifold can support the manifold between the manifold upper guide 36 and the manifold lower guide 38 on each side of the header box 26 and still allow some lateral, vertical, and longitudinal movement of the manifold.

The header box 26 for each manifold is connected to the firebox floor 9 of the firebox 8. The header boxes 26 are supported by header box supports 28 that in turn are supported by a datum 30, such as the ground. The transfer line 14 is supported by a transfer line support 32 that in turn is supported by the datum 30. The transfer line support 32 includes a saddle 34 that may closely fit the contour of the transfer line.

Heating from ambient conditions causes thermal expansion and growth of the components and in general deformation or bowing and other thermal movement. Some flexibility is designed into the systems. There is a need for the components to be physically supported and guided suitably, yet allow for their growth in size due to thermal expansion. While the inlet system, the catalyst tubes, and the outlet system are each supported, any one support method could have an influence on the others. The piping of the inlet system 4 is supported on fixed supports as well as springs supports. The catalyst tubes 6 are supported by constant spring hangers. The catalyst tubes 6 are connected to the manifolds 12 of the outlet system 10 via stub pipes. The manifold tubes are supported by the upper and lower guides 36, 38 in combination with the slides 40, the header boxes are supported by the header box supports 28, and the transfer line 14 is supported by the transfer line support 32, as described above.

However, the thermal expansion can be so great that the above described support system is incapable of sufficient support that still allows the required growth from the thermal expansion during operations. The expansion can cause twisting and rupture or breakage in one or more of the components and their connections to is adjacent components.

FIG. 4 is a side schematic view of the reformer shown in FIG. 1. FIG. 5 is a top schematic view of the outlet system shown in FIG. 1. The figures will be described in conjunction with each other. During operation, the temperatures can be, for example, about 1600° F. (870° C.) for the manifold and about 250° F. (120° C.) for the header box. The amount of thermal expansion can cause the firebox floor 9 to bow vertically to a floor position 9' in the middle of length of the firebox 8 or at other locations. The header box 26, being attached to the firebox floor 9, is forced to bend vertically to a header box position 26'. The manifold 12, being supported and guided by the guides 36, 38 of the header box, also bends vertically to a manifold position 12'. Thus, the outlet system 10 can expand in a longitudinal direction 46 and is bent into a different position in a vertical direction 42 during operation.

Concurrently, the transfer line 14 bends laterally due to thermal expansion to a transfer line position 14'. The connection tees 16A, 16B, being attached to the transfer line, bend laterally to connection tee positions 16A', 16B'. The manifolds 12A, 12B, being attached to the connection tees, bend laterally to manifold positions 12A', 12B'. Thus, the outlet system 10 is bent into a different position in a lateral direction 44 during operation.

The consequence is failure at multiple locations. Stresses induced on the various components exceed the allowable stresses and the connections, manifolds, and joints fail.

Therefore, there remains a need to provide an improved support and header box system for the outlet system components.

BRIEF SUMMARY OF THE INVENTION

The disclosure provides an independent support of outlet system in a steam reformer furnace. The thermal expansion of the firebox and/or header box that occurs during operation of a reformer is decoupled from the manifold. The manifold is supported independently on a separate saddle support that supports and allows the manifold to move, while the manifold is still substantially enclosed in the header box. The header box is allowed to expand thermally into different configurations without forcing a substantial change in the manifold configuration. Further, the present invention allows the transfer lines coupled to the manifold through connection tees to laterally move the manifold and reduce lateral stress on the manifold. Thus, the invention provides for independent support of the manifold that allows vertical, lateral, and longitudinal thermal expansion of associated components without overstressing the manifold and causing failures.

The disclosure provides an improved steam-hydrocarbon reformer, comprising: an inlet system configured to supply a steam-hydrocarbon mixture; a plurality of rows of catalyst tubes connected to the inlet system and vertically disposed and configured to allow flow of the steam-hydrocarbon mixture therethrough; a plurality of manifolds connected to the plurality of rows of catalyst tubes and configured to receive and aggregate the flow of the steam-hydrocarbon mixture from a respective row of catalyst tubes connected to a respective manifold; at least one transfer line coupled between at least two of the plurality of manifolds, the transfer line configured to receive and aggregate the flow of the steam-hydrocarbon mixture from the at least two manifolds; a firebox configured to enclose the rows of catalyst tubes and having a firebox bottom, the rows of catalyst tubes extending through the firebox bottom to the respective manifolds that are connected to the respective rows, the manifolds being located below the firebox bottom; a plurality of header boxes connected to the firebox bottom and configured to enclose the plurality of manifolds therein, the header boxes disposed below the firebox bottom in line with the manifolds, a respective manifold being enclosed by a respective header box, the header boxes having openings formed through the header boxes; a plurality of manifold supports mounted on a datum and disposed through the openings in the header boxes, and configured to support the manifolds independently of the header boxes that enclose the manifolds; and a plurality of seals disposed between the manifold supports and the header boxes at the is openings and configured to seal the openings.

DETAILED DESCRIPTION

Figure 1:
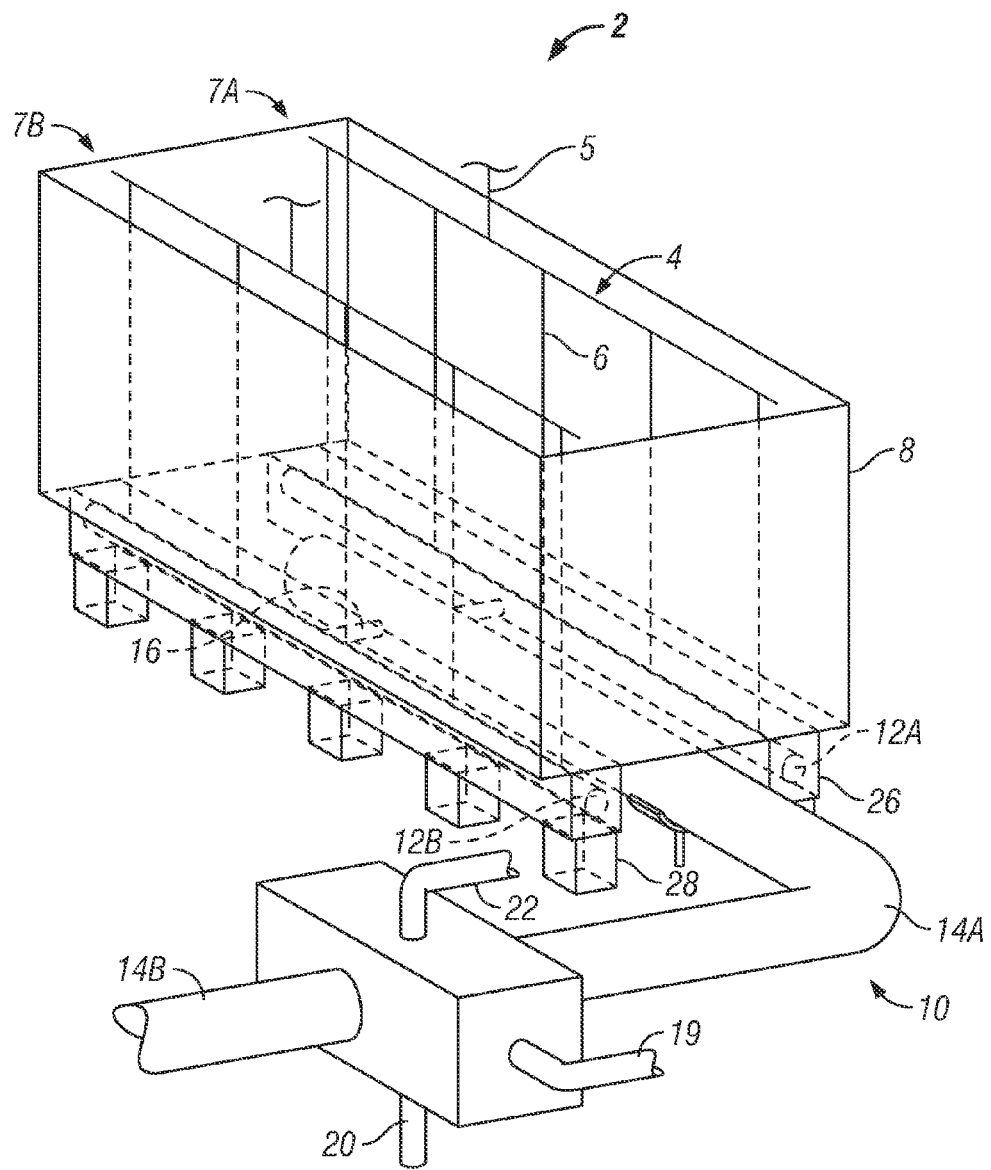
FIG. 1 is a perspective schematic view of a known exemplary reformer.
Figure 2:
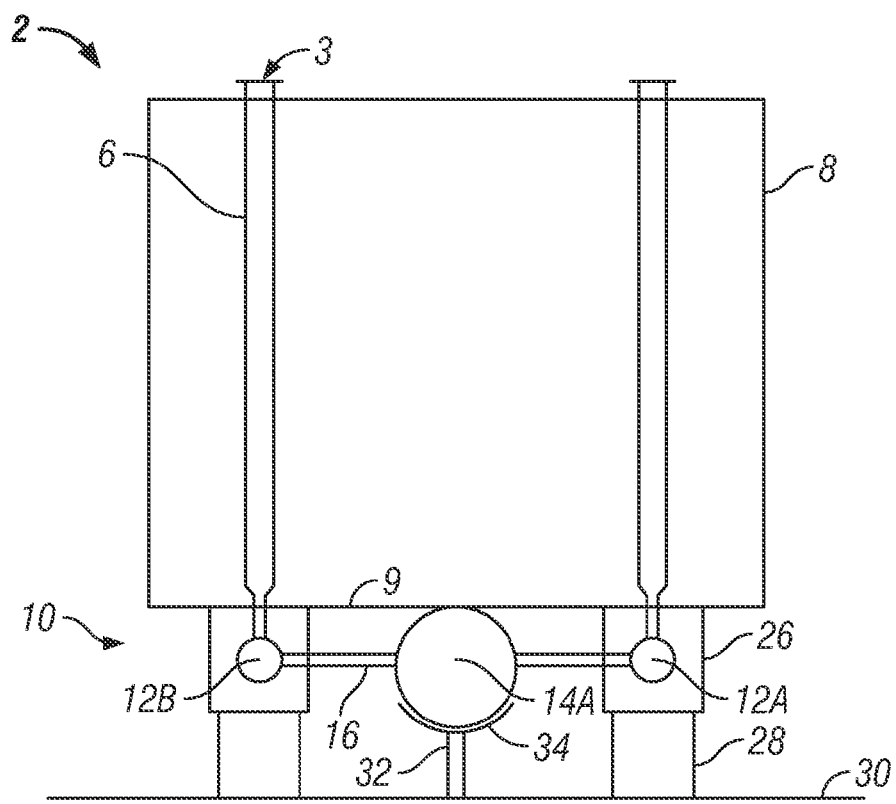
FIG. 2 is an end schematic view of the reformer shown in FIG. 1.
Figure 3:
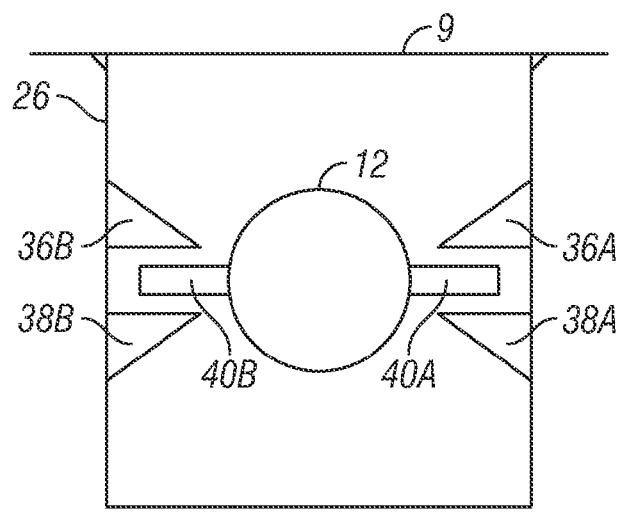
FIG. 3 is a detail end view of a manifold guide system used in the exemplary reformer shown in FIG. 1.
Figure 5:
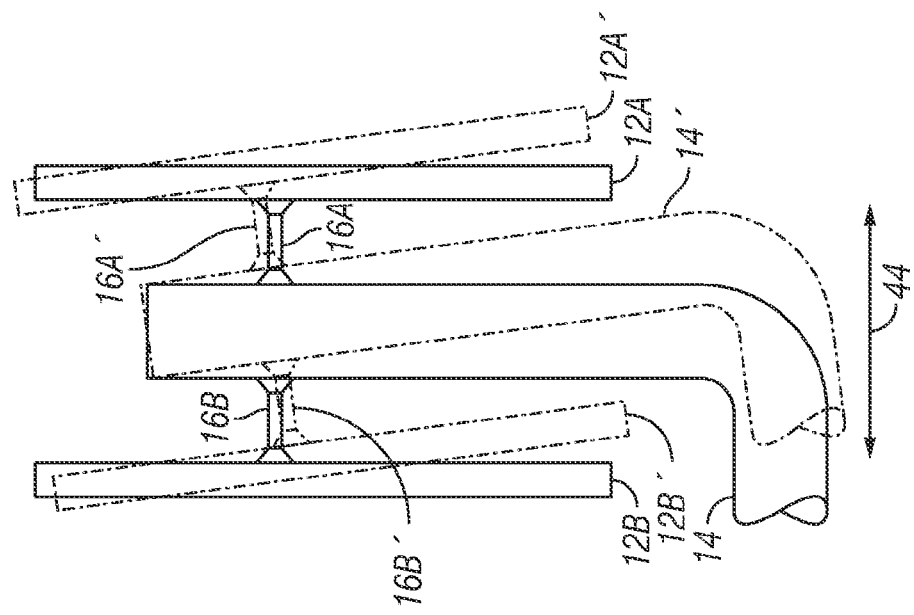
FIG. 5 is a top schematic view of the outlet system shown in FIG. 1.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific is decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, elements have been labeled with an "A" or "B" to designate one portion of the system or another. When referring generally to such elements, the number without the letter is used. Further, such designations do not limit the number of elements that can be used for that function.

The disclosure provides an independent support of outlet system in a steam reformer furnace. The thermal expansion of the firebox and/or header box that occurs during operation of a reformer is decoupled from the manifold. The manifold is supported independently on a separate saddle support that supports and allows the manifold to move, while the manifold is still substantially enclosed in the header box. The header box is allowed to expand thermally into different configurations without forcing a substantial change in the manifold configuration. Further, the present invention allows the transfer lines coupled to the manifold through connection tees to laterally move the manifold and reduce lateral stress on the manifold. Thus, the invention provides for independent support of the manifold that allows vertical, lateral, and longitudinal thermal expansion of associated components without overstressing is the manifold and causing failures.

Figure 6:
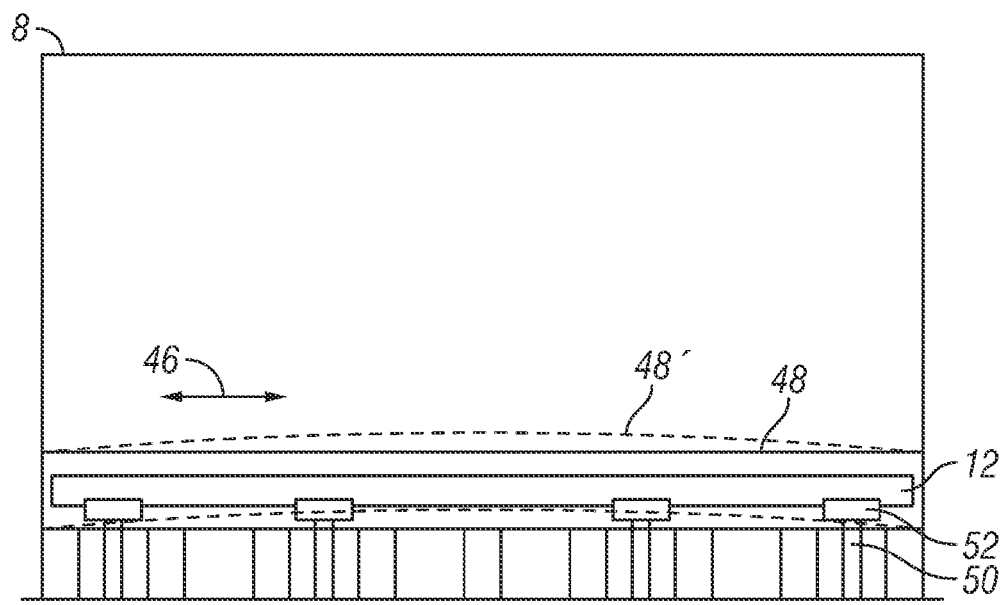
FIG. 6 is a side schematic view of a reformer corresponding to the reformer of FIGS. 1-5 with an improved manifold support and header box configuration for the outlet system.
Figure 7:
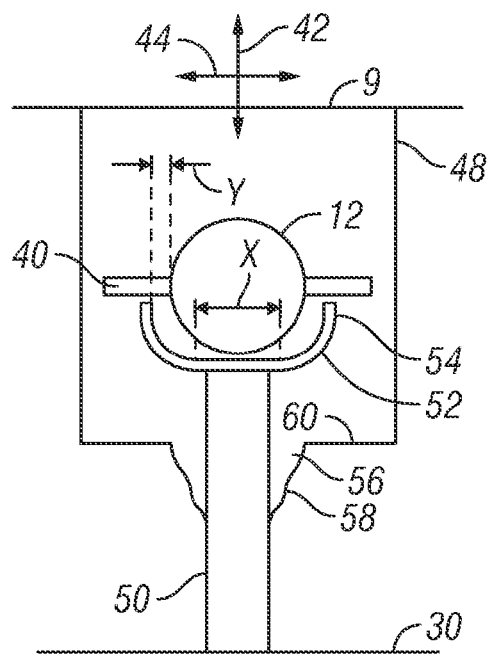
FIG. 7 is an end schematic view of a detail of the improved manifold support and header box configuration shown in FIG. 6.

FIG. 6 is a side schematic view of a reformer corresponding to the reformer of FIGS. 1-5 with an improved manifold support and header box configuration for the outlet system. FIG. 7 is an end schematic view of a detail of the improved manifold support and header box configuration shown in FIG. 6. The figures will be described in conjunction with each other. In the improved manifold support and header box configuration, the manifold is supported independently of the header box to allow free movement of the header box from the manifold while the manifold is still enclosed within the header box.

More specifically, the improved header box 48 is connected to the firebox 8 in a similar manner as described before for the header box 26. However, the header box 48 is formed with an opening 56 through a wall 60 of the header box, such as the bottom of the header box. A manifold support 50 can be disposed through the opening 56 to support directly the manifold 12 independently of the header box 48, which is in contrast to the prior described header box support system for the manifold using the manifold upper and lower guides 36, 38 with the manifold slide 40. The manifold 12 is no longer dependent on support from the header box support system even though the manifold is still enclosed within the header box. In the present invention, the support of the manifold 12 is decoupled from the header box 48.

In at least one embodiment, the opening 56 can be a series of openings along the length of the header box 48. The opening 56 is sealed around the support 50 with a seal 58 that is generally flexible and can allow the header box 48 to expand thermally during operation without impairing the support 50 and restricting gas leakage and/or air ingress. The seal 58 can be insulative to help maintain a level of heat within the header box 48 for the manifold 12.

Figure 4:
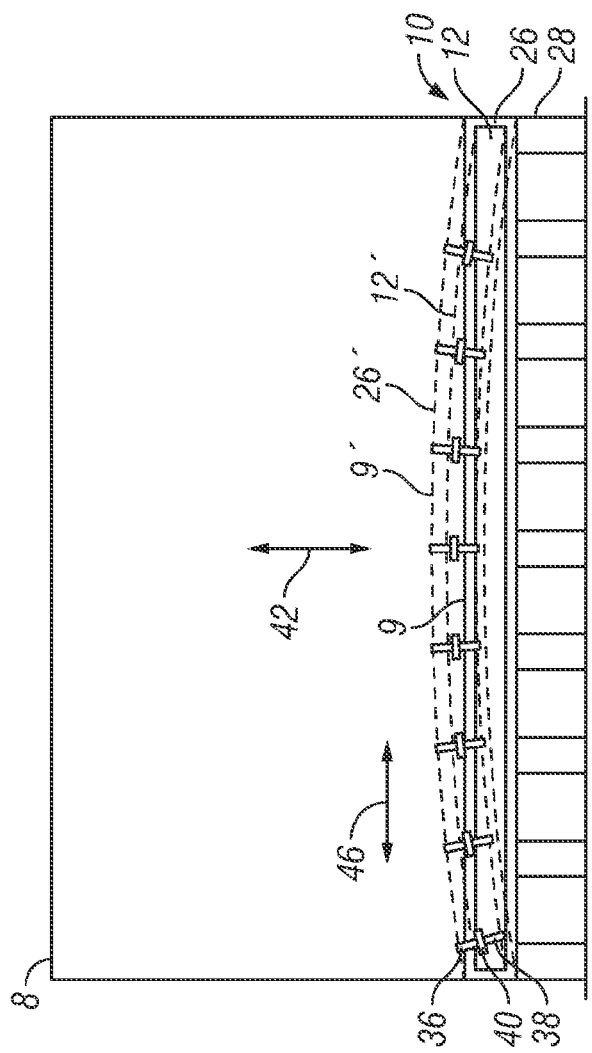
FIG. 4 is a side schematic view of the reformer shown in FIG. 1.

As shown in FIG. 6, the header box 48 can thermally expand to the same degree as the header box 26 shown in FIG. 4, that is to a header box position 48'. However, the manifold 12 is decoupled from the movement of the header box 48 to the header box position 48', so that the manifold can stay relatively stationary and is supported on the supports 50 along the manifold longitudinal length. Thus, the header box 48 can move vertically with the thermal expansion in the vertical direction 42 (and contract upon cooling) without affecting the position of the manifold 12, even while the manifold is substantially enclosed within the header box.

Further, the support 50 can include an extended support surface 52, such as a wide saddle. A portion of the extended support surface 52 has a lateral width "X" that is positioned in such a manner that the extended support surface 52 can support the manifold 12 when the manifold is in a variety of lateral positions. As the components of the outlet system, such as the transfer line 14 shown in FIG. 5, thermally expand, the width X of the extended support surface 52 allows the manifold to move laterally (and longitudinally) to accommodate the thermal expansion (and contraction upon cooling) in the lateral direction 44 (and longitudinal direction 46) while still supporting the manifold thereon. The extended support surface 52 can include vertically extended arms 54 that are spaced a lateral distance from the perimeter of the manifold, such as a distance "Y", to allow the lateral thermal expansion without impairing the restraint that might be caused on the arms 54. As a result of the improved support system for the outlet system 10, the manifolds, transfer lines, and associated fittings are supported independently of the header boxes.

New construction and retrofit construction of existing reformers are contemplated. In at least one exemplary retrofit installation, the header box 26 need not be removed from the firebox 8, specifically the firebox floor 9. Only openings to pass the manifold supports 50 need to be made. The supports 50 can be installed on the existing manifold 12, without requiring removal of the existing manifold slides 40 used in the prior configuration. The header box 48 can be improved on-site with an opening 56 to allow space for the support 50 to pass into the header box. For example, the header box can be made in two halves with a left side and a right side and attached to the firebox floor to leave a longitudinal opening 56 between the halves. The seal 58 can be installed to sealingly engage the support 50 and the header box 48.

Figure 8:
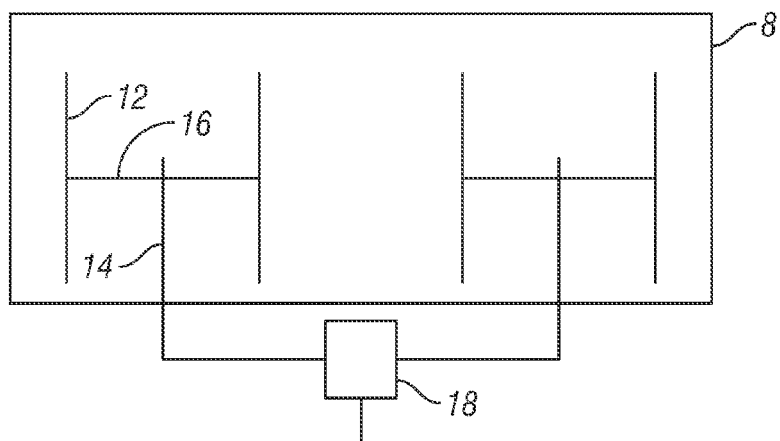
FIG. 8 is a top schematic view of another exemplary outlet system.

FIG. 8 is a top schematic view of another exemplary outlet system. While the two row system was described above as a simplified exemplary embodiment for present purposes, other configurations of manifolds and transfer lines are contemplated as referenced above. For example and without limitation, a firebox 8 can include four rows and four manifolds 12 with two transfer lines 16 each connected to a pair of manifolds through the connection tees 16. Each transfer line can be connected to the heater 18. Each of the manifolds can be supported by the improved manifold support and header box configuration described above.

Figure 9:
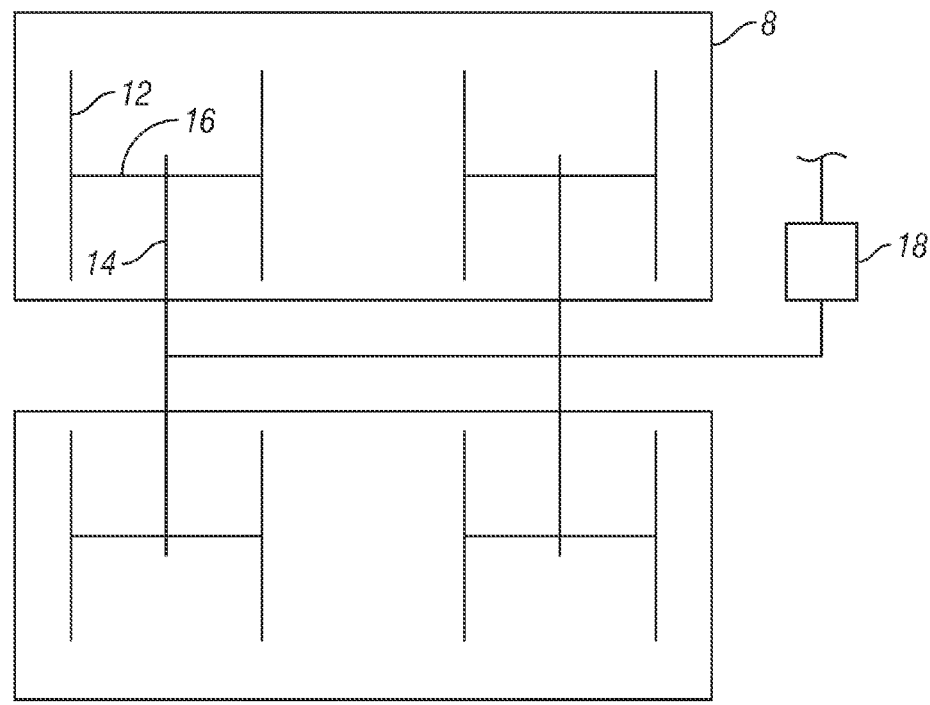
FIG. 9 is a top schematic view of another exemplary outlet system.

FIG. 9 is a top schematic view of another exemplary outlet system. Without limitation, multiple fireboxes 8 with multiple manifolds 12 can be connected to multiple transfer lines 14 with connection tees 16. The transfer lines 14 from each of the fireboxes 8 can be connected together or otherwise directed to the heater 18. Each of the manifolds can be supported by the improved manifold support and header box configuration described above.

Other and further embodiments utilizing one or more aspects of the inventions described above can be devised without departing from the spirit of Applicant's invention. Further, the various methods and embodiments of the catamaran system can be included in combination with each other to produce variations of the disclosed methods and embodiments. Discussion of singular elements can include plural elements and vice-versa. References to at least one item followed by a reference to the item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, the Applicant intends to protect fully all such modifications and improvements that come within the scope or range of equivalent of the following claims.

What is claimed is:

1. An improved steam-hydrocarbon reformer, comprising:
   an inlet system configured to supply a steam-hydrocarbon mixture;
   a plurality of rows of catalyst tubes connected to the inlet system and vertically disposed and configured to allow flow of the steam-hydrocarbon mixture therethrough;
   a plurality of manifolds connected to the plurality of rows of catalyst tubes and configured to receive and aggregate the flow of the steam-hydrocarbon mixture from a respective row of catalyst tubes connected to a respective manifold;
   at least one transfer line coupled between at least two of the plurality of manifolds, the transfer line configured to receive and aggregate the flow of the steam-hydrocarbon mixture from the at least two manifolds;
   a firebox configured to enclose the rows of catalyst tubes and having a firebox bottom, the rows of catalyst tubes extending through the firebox bottom to the respective manifolds that are connected to the respective rows, the manifolds being located below the firebox bottom;
   a plurality of header boxes connected to the firebox bottom and configured to enclose the plurality of manifolds therein, the header boxes disposed below the firebox bottom in line with the manifolds, a respective manifold being enclosed by a respective header box, the header boxes having openings formed through the header boxes;
   a plurality of manifold supports mounted on a datum and disposed through the openings in the header boxes, and configured to support the manifolds independently of the header boxes that enclose the manifolds; and
   a plurality of seals disposed between the manifold supports and the header boxes at the openings and configured to seal the openings.

2. The reformer of claim 1, wherein the openings in the header boxes comprise a longitudinal opening or a plurality of openings formed along a length of the bottom of the respective header box.

3. The reformer of claim 1, wherein the manifold supports comprise an extended support surface laterally disposed under the respective manifold being supported.

4. The reformer of claim 1, wherein the manifold supports comprise an extended support surface laterally disposed under the respective manifold being supported and having an upwardly extending arm on each side of the extended support surface with a clearance between the respective arm and the manifold to allow lateral movement of the manifold on the extended support surface.

5. The reformer of claim 1, wherein the manifolds are decoupled from thermal movement of the header box.

6. The reformer of claim 1, wherein the manifold supports allows vertical and lateral movement of the manifolds supported by the manifold supports.

7. The reformer of claim 1, wherein the seal is insulative.

8. The reformer of claim 1, further comprising a heater connected to the transfer line.

9. The reformer of claim 1, wherein at least one of the header boxes is formed in two halves and connected to the firebox bottom with a space between the halves to form the opening through the header box.

10. The reformer of claim 1, further comprising a transfer line support configured to support the transfer line.

* * * * *